United States Patent
Colwell et al.

(10) Patent No.: US 10,051,842 B2
(45) Date of Patent: Aug. 21, 2018

(54) BIRD FEEDER PERCH EXTENSION

(71) Applicant: Classic Brands, LLC, Denver, CO (US)

(72) Inventors: Scott Colwell, Foster, RI (US); Scott Merritt, Newmarket (CA)

(73) Assignee: Classic Brands, LLC, Denver, CO (US)

( * ) Notice: Subject to any disclaimer, the term of this patent is extended or adjusted under 35 U.S.C. 154(b) by 356 days.

(21) Appl. No.: 14/842,681

(22) Filed: Sep. 1, 2015

(65) Prior Publication Data

US 2017/0339924 A1    Nov. 30, 2017

Related U.S. Application Data

(60) Provisional application No. 62/044,538, filed on Sep. 2, 2014.

(51) Int. Cl.
| | |
|---|---|
| *A01K 39/01* | (2006.01) |
| *A01K 31/12* | (2006.01) |
| *A01K 5/01* | (2006.01) |

(52) U.S. Cl.
CPC .............. *A01K 31/12* (2013.01); *A01K 39/01* (2013.01); *A01K 5/01* (2013.01)

(58) Field of Classification Search
CPC ...... A01K 31/12; A01K 39/01; A01K 39/012; A01K 39/014; A01K 31/06
See application file for complete search history.

(56) References Cited

U.S. PATENT DOCUMENTS

| | | | | |
|---|---|---|---|---|
| 4,318,364 A | * | 3/1982 | Bescherer | A01K 39/012 119/57.8 |
| 5,215,039 A | * | 6/1993 | Bescherer | A01K 39/012 119/468 |
| 5,588,397 A | * | 12/1996 | Johnakin, III | A01K 31/12 119/468 |
| 6,374,772 B1 | * | 4/2002 | Brandt | A01K 31/12 119/466 |
| 6,543,383 B1 | * | 4/2003 | Cote | A01K 39/012 119/52.2 |
| 7,093,561 B2 | * | 8/2006 | Rich | A01K 39/012 119/57.8 |
| 7,237,507 B1 | * | 7/2007 | Colwell | A01K 39/0113 119/51.01 |
| 7,302,911 B1 | * | 12/2007 | Lush | A01K 39/012 119/52.2 |
| 7,448,346 B1 | * | 11/2008 | Stone | A01K 31/12 119/52.3 |
| 9,713,319 B2 | * | 7/2017 | Vaughn, Jr. | A01K 39/012 |
| 2001/0029898 A1 | * | 10/2001 | Banyas | A01K 31/12 119/57.8 |
| 2013/0255581 A1 | * | 10/2013 | Donegan | A01K 39/01 119/57.8 |

(Continued)

*Primary Examiner* — Trinh T Nguyen
(74) *Attorney, Agent, or Firm* — Polsinelli, PC

(57) ABSTRACT

A perch extension for a bird feeder having an elongated perch body that defines a mounting cavity that is adapted to fit at least partially over a perch on a bird feeder. The perch extension may optionally have a support member that is coupled to the perch body, and is further adapted to fit at least partially around the seed container of the bird feeder. The perch extension may optionally define protuberances to provide a snap-fit or press-fit engagement with the bird feeder perch.

6 Claims, 7 Drawing Sheets

(56) References Cited

U.S. PATENT DOCUMENTS

| | | | |
|---|---|---|---|
| 2015/0342152 A1* | 12/2015 | Evans | A01K 39/01 119/52.2 |
| 2016/0007573 A1* | 1/2016 | Vaughn, Jr. | A01K 39/01 119/57.8 |
| 2016/0165855 A1* | 6/2016 | MacKelvie | A01K 39/01 119/57.9 |
| 2017/0231202 A1* | 8/2017 | Cote | A01K 39/012 119/57.8 |

* cited by examiner

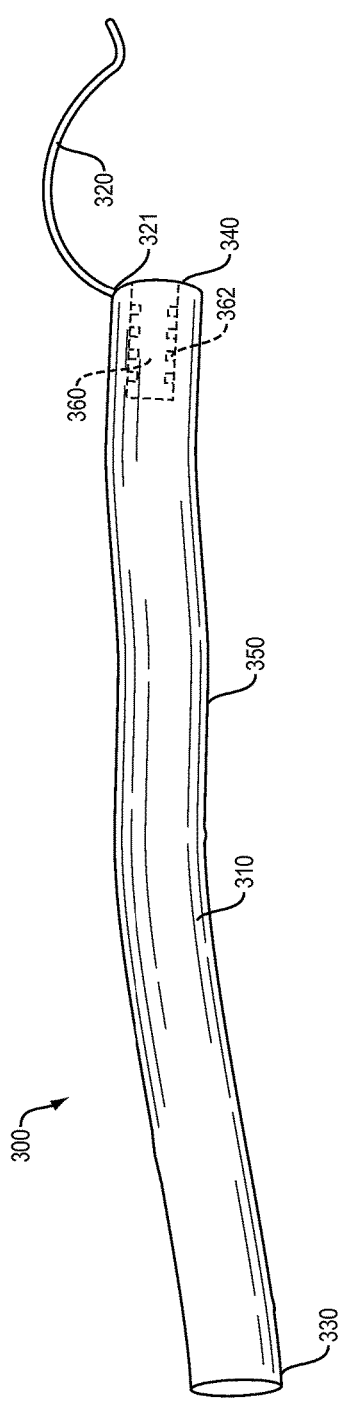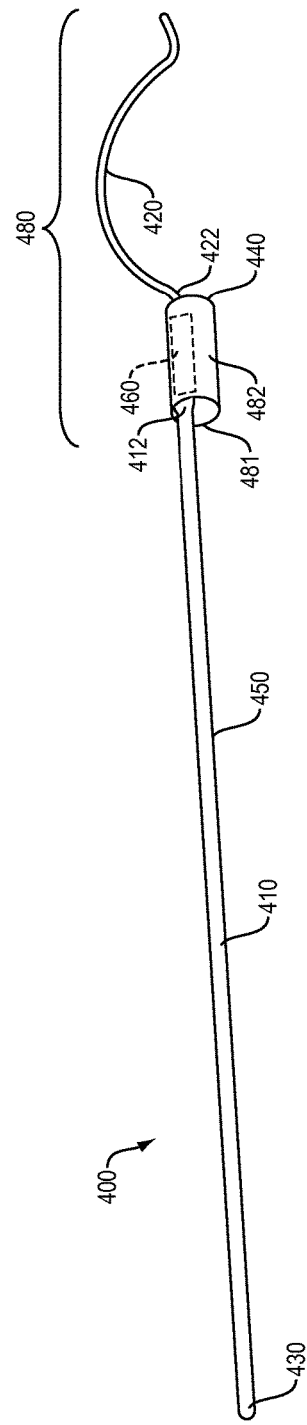
FIG. 3A
FIG. 3B

BIRD FEEDER PERCH EXTENSION

CROSS REFERENCE TO RELATED APPLICATIONS

This application claims priority to U.S. Provisional Application Ser. No. 62/044,538, filed on Sep. 2, 2014. The contents of this parent application are hereby incorporated by reference.

BACKGROUND OF THE INVENTION

Field of the Invention

The present disclosure relates to bird feeders, and specifically to removable bird feeder perch extensions that increase the available landing area for perching and feeding.

Description of the Background

Many bird feeders have one or more perches where a bird may land and rest upon as the bird eats from the feeder.

One such prior art bird feeder is shown in FIG. 1. This drawing is taken from U.S. Pat. No. 7,237,507, issued on Jul. 3, 2007. As shown in FIG. 1, bird feeder 12 includes a base 30, seed baffle 32 and a seed housing 34 that together define a seed compartment or container 36. Seed housing 34 is a substantially cylindrical tube. Seed housing 34 includes at least one aperture 38 through which birds may access seed contained therein from external perches 40.

Another such prior art bird feeder is shown in FIG. 2. This drawing is taken from U.S. Pat. No. 7,946,248, issued on May 24, 2011. As shown in FIG. 2, bird feeder 50 comprises elongated seed tube or container 10, base 100, diverter 90, cover 20, and three pairs of feeder ports 52a and 52b, 152a and 152b, and 252a and 252b. Feeder port 52a is representative of all the feeder ports, and comprises an external perch 80.

Many species of birds, when using the short perches on these prior art feeders, such as perches 40 and 80 in FIGS. 1 and 2, respectively, will take a seed and fly off to a nearby tree or bush, out of sight, to open the seed and consume the de-hulled kernel. When the perches are longer, however, some bird species will take a seed, hop down the length of the perch to remove it from the hull, eat the kernel, and then return to the feeder port. The longer perches thus encourage the birds to stay at the feeder longer. This in turn results in greater bird visibility for bird watchers, improving the bird feeding experience.

Manufacturing bird feeders with longer fixed perches, however, creates distribution issues, because the longer perches require larger containers, which increases packaging and shipping costs. In addition, consumers wishing to take advantage of the longer perches would need to replace their existing feeders, which is costly and inconvenient.

There is a need in the art, then, for systems and methods of selectively extending the length of one or more bird feeder perches to accommodate a bird's natural foraging behavior. Ideally, such systems and methods would provide removable perch extensions that could be included as part of a complete bird feeder package without requiring significantly larger containers. Alternatively, such systems and methods would be available individually or as a set to retrofit existing bird feeders. It is also desirable for these perch extensions to be easily attached or detached by the consumer as desired.

SUMMARY OF THE INVENTION

The present invention provides systems and methods for extending the available landing area for birds to perch and feed on a variety of different types of bird feeders.

In a preferred embodiment, the invention provides a perch extension for a bird feeder that has at least one perch. The perch extension comprises an elongated perch body that defines a partially hollow interior, where the perch body interior is configured to contain at least a portion of the bird feeder perch.

In an aspect, the perch extension further comprises a support member that defines a first end that is configured to be coupled to the perch body, and a second end that is configured to be coupled to the bird feeder. In another aspect, the perch body further comprises at least one protuberance that extends into the perch body interior, where the protuberance is configured to removably couple the perch body to the bird feeder perch.

In another preferred embodiment, the invention provides a perch extension for a bird feeder that has at least one perch. The perch extension comprises an elongated perch body that defines a first end, a longitudinally opposite second end, and a mounting cavity open at the second end that is configured to fit at least partially over the bird feeder perch.

In an aspect, the mounting cavity is configured to have a substantially similar shape as the bird feeder perch. In another aspect, the perch body further comprises at least one protuberance that extends into the mounting cavity. In yet another aspect, the perch body is configured to be removably coupled to the bird feeder perch.

In an aspect, the perch extension further comprises a support member that defines a first end that is configured to be coupled to the perch body proximate the second end of the perch body, and is further configured to fit at least partially around the bird feeder. In another aspect, the support member defines a substantially semi-circular shape. In yet another aspect, the support member defines a radius that is approximately the same as a radius of the bird feeder. In still another aspect, the support member defines a curve with a non-zero curvature.

In an additional preferred embodiment, the invention provides a perch extension for a bird feeder having at least one perch. The perch extension comprises an elongated perch body and a connector member coupled to the perch body. The connector member defines a partially hollow interior that is configured to contain at least a portion of the bird feeder perch.

In one aspect, the perch extension further comprises a support member that defines a first end that is configured to be coupled to the perch body, and a second end that is configured to be coupled to the bird feeder. In another aspect, the perch body further comprises at least one protuberance that extends into the perch body interior, where the protuberance is configured to removably couple the perch body to the bird feeder perch.

In another preferred embodiment, the invention provides a perch extension for a bird feeder having at least one perch. The perch extension comprises an elongated perch body that defines a first end and a longitudinally opposite second end and a connector member that is coupled to the perch body proximate the second end of the perch body. The connector member further defines a mounting cavity that is adapted to fit at least partially over the bird feeder perch.

In an aspect, the mounting cavity is further adapted to fit at least partially over the elongated perch body. In another aspect, the perch body and the bird feeder perch are coupled within the mounting cavity. In still another aspect, the connector member further comprises at least one protuberance that extends into the connector member interior.

In another preferred embodiment, the invention provides a perch extension for a bird feeder that has at least one perch. The perch extension comprises an elongated perch body that defines a substantially U-shaped mounting channel, where the mounting channel is configured to fit at least partially over a portion of the bird feeder perch.

In an aspect, the mounting channel extends along the majority of the length of the perch body. In another aspect, the perch extension further comprises at least one projection that extends into the mounting channel.

Although the present invention is described and illustrated herein as being implemented with tubular bird feeders, the embodiments described herein are provided as examples and are not limitations. As those skilled in the art will appreciate, the present invention is suitable for application in a variety of different types of bird feeders.

BRIEF DESCRIPTION OF THE DRAWINGS

The foregoing and other features and advantages will be apparent from the following more particular description of exemplary embodiments of the disclosure, as illustrated in the accompanying drawings, in which like reference characters refer to the same parts throughout the different views. The drawings are not necessarily to scale, emphasis instead being placed upon illustrating the principles of the disclosure.

FIG. 3A is a perspective view of a bird feeder perch extension in accordance with a first preferred embodiment of the invention;

FIG. 3B is a perspective view of a bird feeder perch extension in accordance with a second preferred embodiment of the invention;

DETAILED DESCRIPTION OF PREFERRED EMBODIMENTS

Figure 4B:
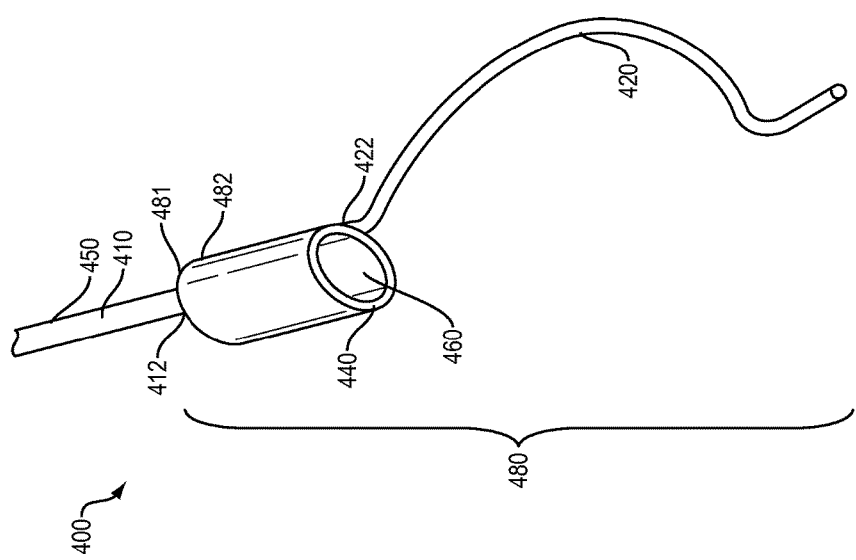
FIG. 4B is a partial perspective view of the bird feeder perch extension of FIG. 3B.
Figure 4A:
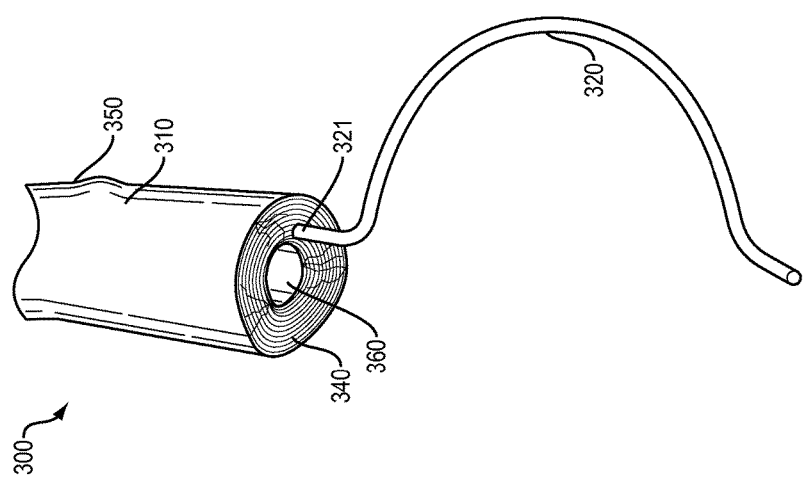
FIG. 4A is a partial perspective view of the bird feeder perch extension of FIG. 3A.

With reference to FIGS. 3A and 4A, in a preferred embodiment, bird feeder perch extension 300 comprises an elongated perch body 310 and an optional, substantially semi-circular support member 320. In other embodiments, optional support member 320 may define a curve shape with a non-zero curvature.

Perch body 310 defines a tip 330 at a first end, a base 340 at the substantially longitudinally opposite second end, and an outer surface 350 that provides a landing surface to allow one or more birds to rest and position themselves for feeding.

Perch body 310 is at least partially hollow and defines a mounting cavity 360 open at the base 340. As discussed in detail below, mounting cavity 360 has a shape that is adapted or configured to fit at least partially over a bird feeder perch, such as the prior art perches 40 and 80 in FIGS. 1 and 2, respectively.

A first end 321 of support member 320 is coupled to perch body 310 proximate perch body base 340. In preferred embodiments, support member 320 may be removably coupled to perch body 310 with a snap-fit or press-fit engagement. As discussed in detail below, support member 320 is sized to fit at least partially around bird feeder seed tubes or containers, such as prior art bird feeder seed tubes 34 and 10 in FIGS. 1 and 2, respectively.

Figure 1:
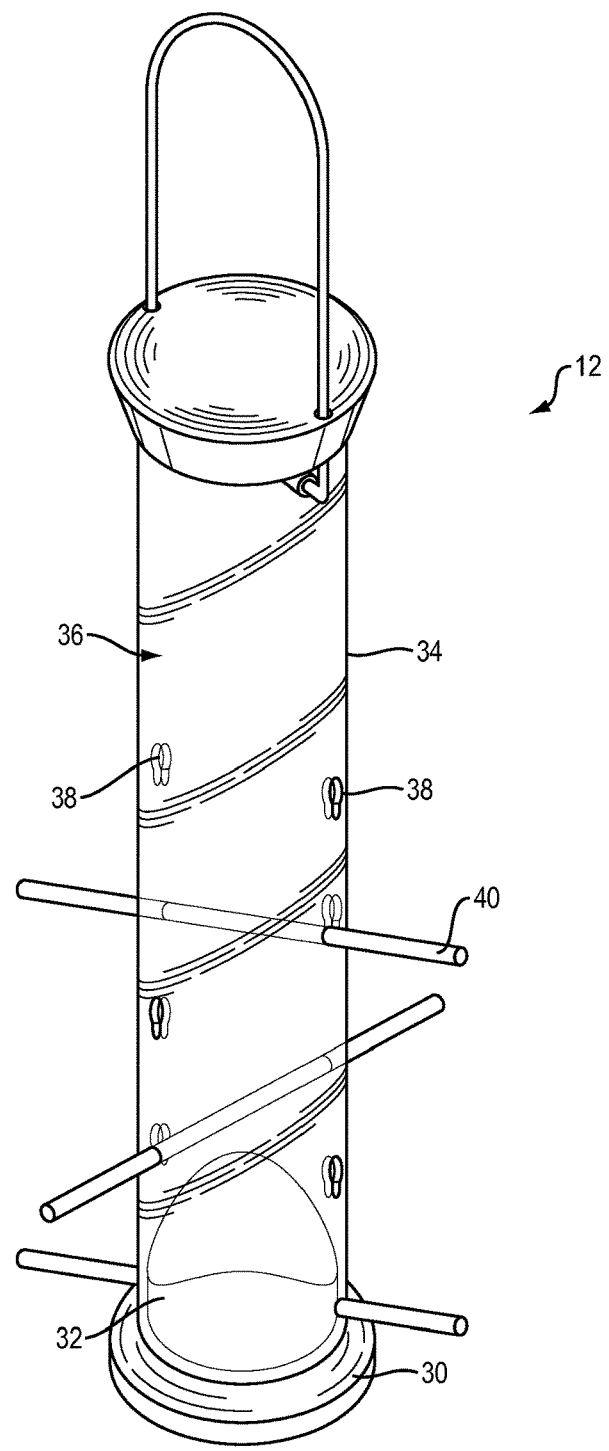
FIG. 1 is a perspective view of a first prior art bird feeder.
Figure 2:
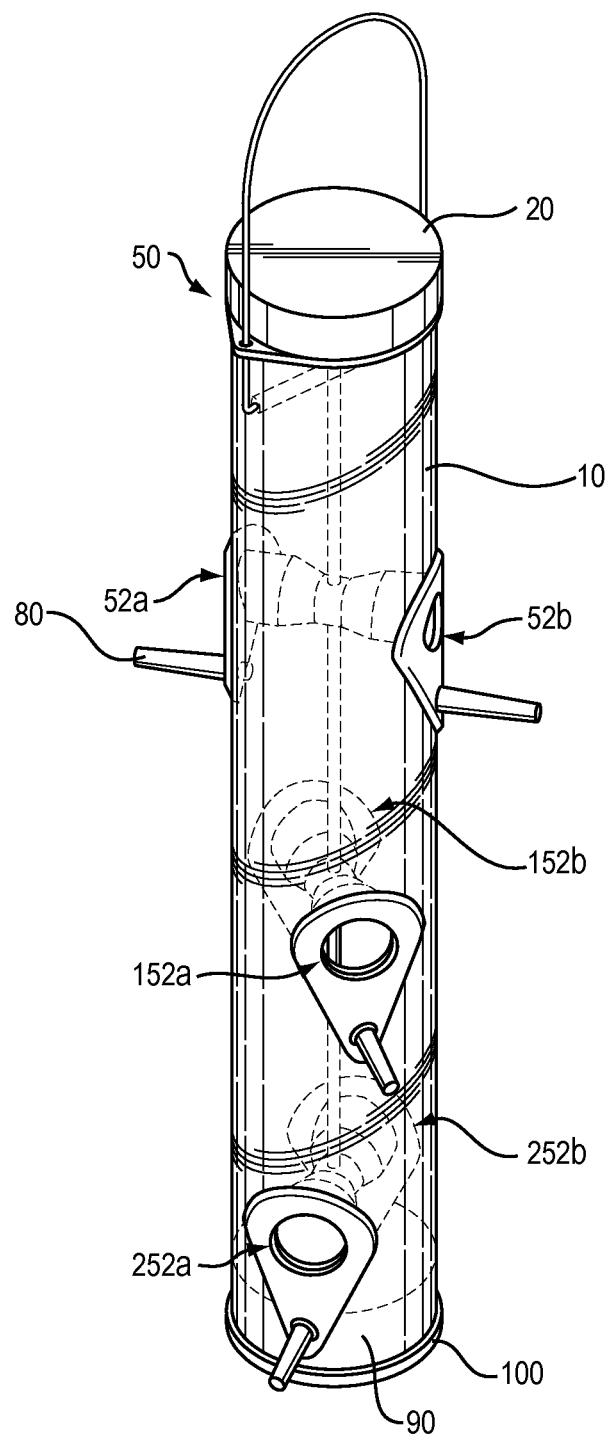
FIG. 2 is a perspective view of a second prior art bird feeder.
Figure 5:
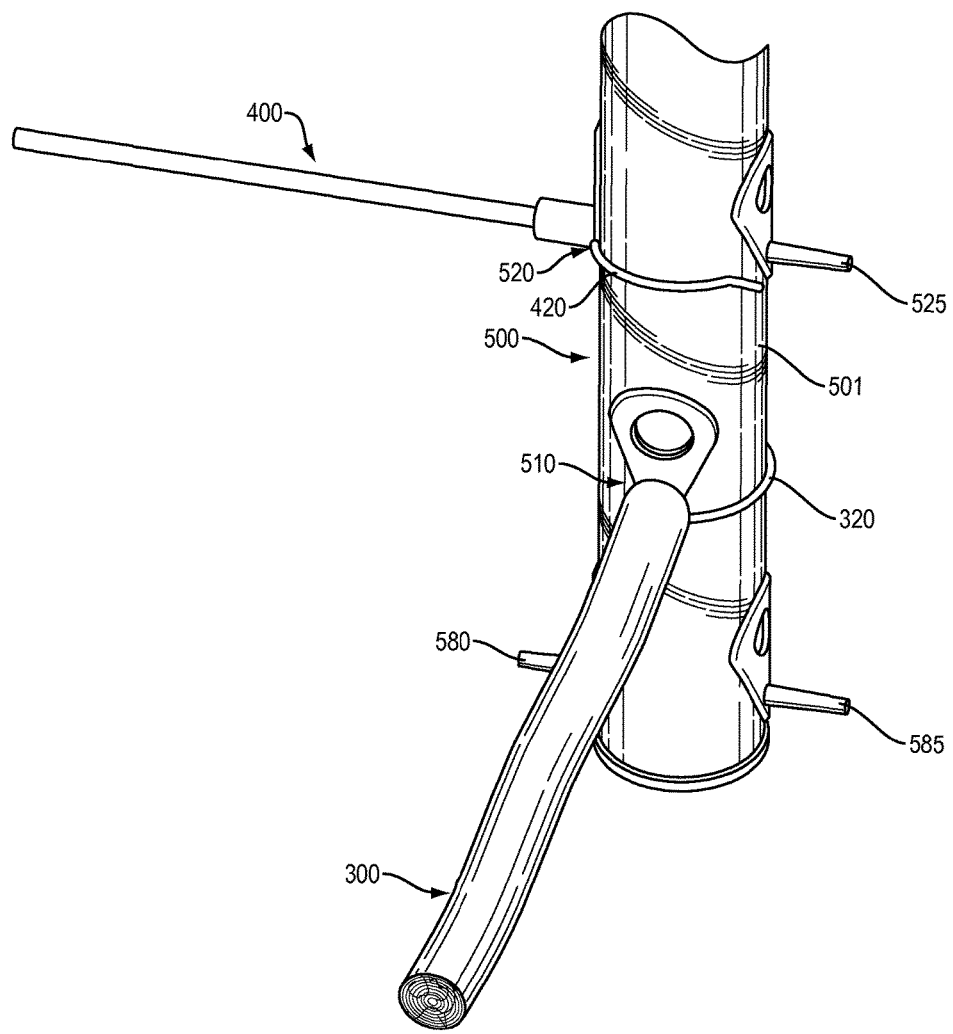
FIG. 5 is a partial perspective view of the bird feeder extensions of FIGS. 3A and 4A mounted on a bird feeder.

Bird feeder perch extension 300 is configured to be attached to, and detached from, a bird feeder, such as the prior art bird feeders 12 and 50 in FIGS. 1 and 2, respectively, described above. As shown in FIG. 5, bird feeder 500 comprises bird feeder perches at perch locations 580, 585, 510, 520 and 525, and bird feeder perch extension 300 is removably coupled to bird feeder 500 at perch location 510. Note that the particular bird feeder used in this example is not a limitation of the invention, and that the bird feeder perch extensions of the invention may be adapted or configured for use with tubular bird feeders of varying length and diameter having protruding perches. In addition, and as described above, support member 320 is optional, such that the bird feeder perch extensions of the invention may also be adapted or configured for use with non-tubular bird feeders having protruding perches.

With further reference to FIG. 5, the perch at location 510 is at least partially contained within the mounting cavity 360 of bird feeder perch extension 300. In preferred embodiments, the interior length of mounting cavity 360 is sufficient to contain substantially the entire length of the perch at location 510, such that base 340 of perch body 310 is in contact with the outer surface of bird feeder tube 501.

In addition, in preferred embodiments, mounting cavity 360 is adapted or configured to have a shape that is substantially similar to the perch at location 510, such that the perch fits closely or snugly within the mounting cavity. Mounting cavity 360 further defines an internal circumference that is slightly larger than the external circumference of the perch, such that the perch fits closely or snugly within the mounting cavity 360. In preferred embodiments, perch body 310 may further comprise ribs, knurls or other protuberances, such as the protuberances 362 that extend into the mounting cavity 360, as shown in FIG. 3A, to further secure the fit between the mounting cavity and the perch, and to provide a press-fit or snap-fit engagement with the perch.

With further reference to FIG. 5, support member 320 of bird feeder perch extension 300 at least partially surrounds bird feeder tube 501. In preferred embodiments, the radius of support member 320 is approximately the same as the radius of bird feeder tube 501, such that support member 320 is in contact with the outer surface of bird feeder tube 501.

This combination of mounting cavity 360 and support member 320 is adapted or configured to stabilize the bird feeder perch extensions such that the perch bodes remain substantially horizontal, relative to the base of the bird feeder.

With reference to FIGS. 3B and 4B, in another preferred embodiment, bird feeder perch extension 400 comprises an elongated perch body 410 and an attachment structure 480.

Perch body 410 defines a tip 430 at one end, a base 412 at the substantially longitudinally opposite second end, and an outer surface 450 that provides a landing surface to allow one or more birds to rest and position themselves for feeding.

Attachment structure 480 comprises a connector member 482 and an optional, substantially semi-circular support member 420. In other embodiments, optional support member 420 may define a curve shape with a non-zero curvature. A first end 481 of connector member 482 is coupled to perch body 410 proximate perch body base 412.

Connector member 482 is at least partially hollow, and defines a mounting cavity 460 open at connector member base 440. As discussed in detail below, mounting cavity 460 has a shape that is adapted or configured to fit at least partially over a bird feeder perch, such as the prior art perches 40 and 80 in FIGS. 1 and 2, respectively.

A first end 422 of support member 420 is coupled to connector member 482 proximate connector member base 440. In preferred embodiments, support member 420 may be removably coupled to connector member 482 with a snap-fit or press-fit engagement. As discussed in detail below, support member 420 is sized to fit at least partially around a bird feeder seed tube, such as seed tubes 34 and 10 in FIGS. 1 and 2, respectively.

Bird feeder perch extension 400 is configured to be attached to, and detached from, a bird feeder, such as the prior art bird feeders 12 and 50 in FIGS. 1 and 2, respectively, described above. As shown in FIG. 5, bird feeder perch extension 400 is removably coupled to bird feeder 500 at perch location 520. Note that the particular bird feeder used in this example is not a limitation of the invention, and that the bird feeder perch extensions of the invention may be adapted for use with tubular bird feeders of varying length and diameter having protruding perches. In addition, and as described above, support member 420 is optional, such that the bird feeder perch extensions of the invention may also be adapted for use with non-tubular bird feeders having protruding perches.

With further reference to FIG. 5, the perch at location 520 is at least partially contained within the mounting cavity 460 of bird feeder perch extension 400. In preferred embodiments, the interior length of mounting cavity 460 is sufficient to contain substantially the entire length to the perch at location 520, such that connector member base 440 is in contact with the outer surface of bird feeder tube 501.

In addition, in preferred embodiments, mounting cavity 460 is adapted or configured to have a shape that is substantially similar to the perch at location 520, such that the perch fits closely or snugly within the mounting cavity. Mounting cavity 460 furthers defines an internal circumference that is slightly larger than the external circumference of the perch, such that the perch fits closely or snugly within the mounting cavity.

In preferred embodiments, mounting cavity 460 defines an oblong shape, and extends through substantially the entire length of connector member 482, such that perch body 410 may be inserted through one end of the mounting cavity 460 and a bird feeder perch, such as the prior art perches 40 and 80, may be inserted through the longitudinally opposite end of the mounting cavity 460. In additional preferred embodiments, the proximate ends of the perch body 410 and the bird feeder perch may be removably coupled within the mounting cavity.

In additional alternate embodiments, perch body 410 may further comprise ribs, knurls or other protuberances, similar to the protuberances 362 shown in FIG. 3A, to further secure the fit between the mounting cavity and the perch, and to provide a press-fit or snap-fit engagement with the perch.

With further reference to FIG. 5, support member 420 of bird feeder perch extension 400 at least partially surrounds bird feeder tube 501. In preferred embodiments, the radius of support member 420 is approximately the same as the radius of bird feeder tube 501, such that support member 420 is in contact with the outer surface of bird feeder tube 501.

This combination of mounting cavity 460 and attachment structure 480 is adapted to stabilize the bird feeder perch extensions such that the perch bodes remain substantially horizontal, relative to the base of the bird feeder.

Figure 6C:
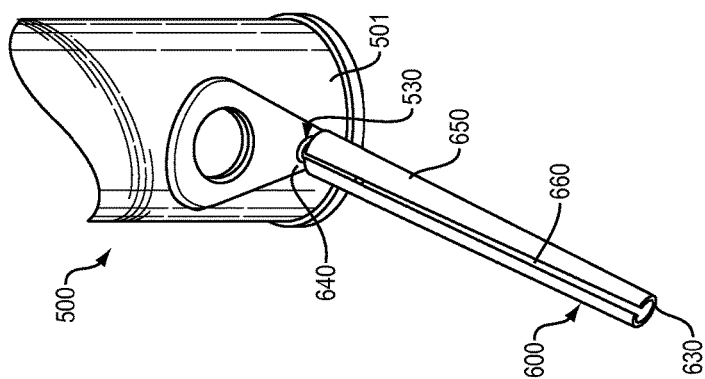
FIG. 6C is a partial perspective view of the bird feeder perch extension of FIG. 6A mounted on a bird feeder.
Figure 6B:
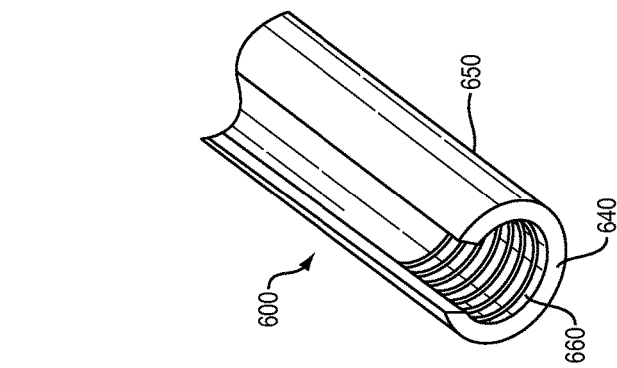
FIG. 6B is a partial perspective view of the bird feeder perch extension of FIG. 6A.
Figure 6A:
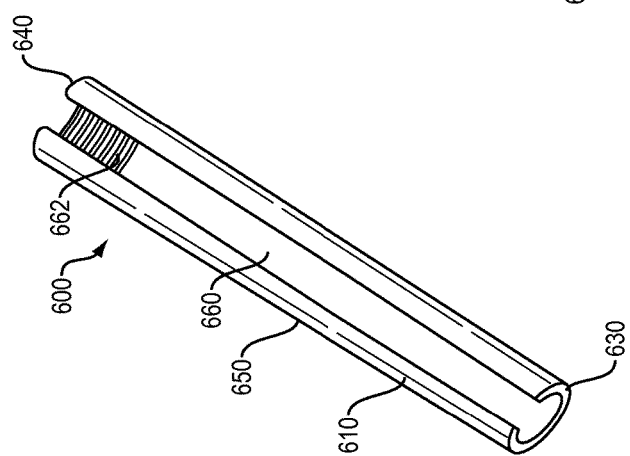
FIG. 6A is a perspective view of a bird feeder perch extension in accordance with a third embodiment of the invention.

With reference to FIGS. 6A, 6B and 6C, in another preferred embodiment, bird feeder perch extension 600 comprises an elongated perch body 610 that defines a tip 630 at a first end, a base 640 at the longitudinally opposite end, and an outer surface 650 that provides a landing surface to allow one or more birds to rest and position themselves for feeding.

Perch body 610 further defines a longitudinal, substantially U-shaped mounting channel or groove 660 that extends along at least a portion of the underside of the perch body, and is open at least at the base 640. Mounting channel 660 has a shape that is adapted or configured to fit at least partially over a bird feeder perch, such as the prior art perches 40 and 80 in FIGS. 1 and 2, respectively.

Bird feeder perch extension 600 is configured to be attached to, and detached from, a bird feeder, such as the prior art bird feeders 12 and 50 in FIGS. 1 and 2, respectively. As shown in FIG. 6C, bird feeder perch extension 600 is removably coupled to bird feeder 500 at perch location 530. Note that the particular bird feeder used in this example is not a limitation of the invention, and that bird feeder perch extensions of the invention may be adapted to many types of bird feeders having protruding perches.

With further reference to FIG. 6C, the perch at location 530 is at least partially contained within mounting channel 660. In preferred embodiments, the interior length of mounting channel 660 is sufficient to contain substantially the entire length of the perch at location 530, such that the base 640 of perch body 610 is in contact with the outer surface of the bird feeder tube 501.

In addition, in a preferred embodiment, a portion of mounting channel 660 proximate the base 640 is fitted with nibs or projections, such as projections 662 shown in FIG. 6A, to provide a snap-fit or press-fit when the perch is inserted into the mounting channel.

In preferred embodiments, perch bodies 310, 410 and 610 have a generally cylindrical, branch-like shape and are constructed of plastic, although neither is a limitation of the invention.

In alternate embodiments, perch bodies 310, 410 and 610 may be constructed of wood or metal, and outer surfaces 350, 450 and 650 may have a wood-like texture. In additional alternate embodiments, perch bodies 310, 410 and 610 may have a substantially linear shape, or a forked shape, although neither are limitations of the invention. Perch bodies 310, 410 and 610 are preferably 3 to 12 inches in length although these are not limitations of the invention.

Figure 7A:
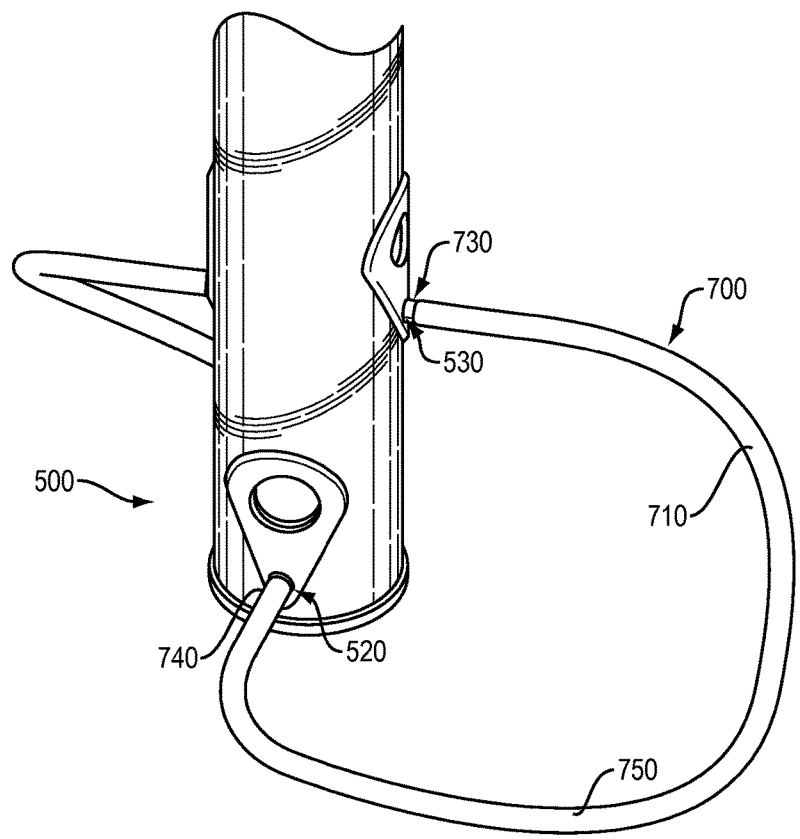
FIG. 7A is a perspective view of a bird feeder extension mounted on a bird feeder, in accordance with a fourth embodiment of the invention.
Figure 7B:
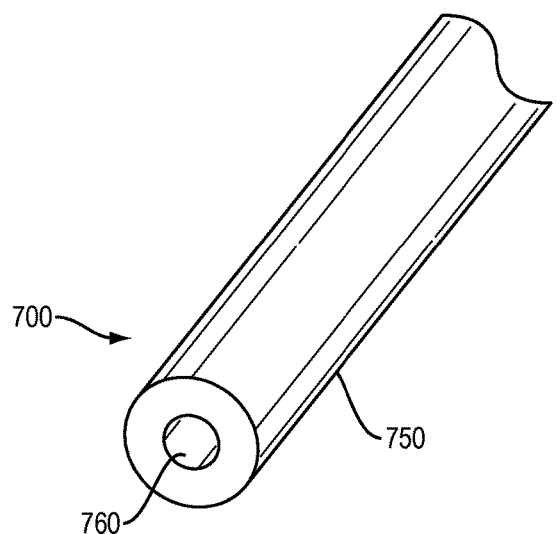
FIG. 7B is a partial perspective view of the bird feeder perch extension of FIG. 7A.

With reference to FIGS. 7A and 7B, in another preferred embodiment, bird feeder perch extension 700 comprises an elongated perch body 710 that defines a first end 730, a longitudinally opposite second end 740, and an outer surface 750 that provides a landing surface to allow a bird to move away from the feeder port while it opens and consumes the seed, or to position itself for feeding.

Perch body 710 further defines a longitudinal, substantially circular-shaped mounting channel 760 that extends along at least a portion of the interior of the perch body, and is open at least at the first end 730 and the second end 740. Mounting channel 760 has a shape that is adapted or configured to fit over a bird feeder perch, such as the prior art perches 40 and 80 in FIGS. 1 and 2, respectively, to provide a press-fit when the perch is inserted into the mounting channel.

Bird feeder perch extension 700 is configured to be attached to, and detached from, a bird feeder, such as the prior art bird feeders 12 and 50 in FIGS. 1 and 2, respectively. Specifically, perch extension 700 is configured to be removably coupled to two perch locations to provide a variety of loop-shaped landing areas. As shown in FIG. 7B, first end 730 of bird feeder perch extension 700 is removably coupled to bird feeder 500 at perch location 530, and second end 740 of bird feeder perch extension 700 is removably coupled to bird feeder 500 at perch location 520. Note that the particular bird feeder used in this example is not a limitation of the invention, and that bird feeder perch extensions of the invention may be adapted to many types of bird feeders having protruding perches.

With further reference to FIG. 7A, the perch at location 530 is at least partially contained within mounting channel 760 proximate first end 730, and the perch at location 520 is at least partially contained within mounting channel 760 proximate second end 740. In preferred embodiments, the interior length of mounting channel 760 is sufficient to contain substantially the entire length of the perches at locations 530 and 520.

In preferred embodiments, perch body 710 has a generally cylindrical shape, is constructed of plastic, and is sufficiently pliable to allow the perch extension 700 to be coupled to any two perches on a prior art bird feeder, although neither is a limitation of the invention. In alternate embodiments, perch body 710 may have a textured surface, and is preferably 6 to 18 inches in length, although these are not limitations of the invention.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A perch extension for a bird feeder, the bird feeder having at least one perch, the perch extension comprising:
    an elongated perch body that defines a partially hollow interior, where the perch body interior is configured to contain at least a portion of the bird feeder perch; and a support member that defines a first end that is configured to be coupled to the perch body proximate the second end of the perch body, wherein the support member having a substantially semi-circular shape with a radius that is approximately the same as a radius of the bird feeder and the support member is configured to fit at least partially around the bird feeder.

2. The perch extension of claim 1, where the perch body further comprises at least one protuberance that extends into the perch body interior, where the protuberance is configured to removably couple the perch body to the bird feeder perch.

3. A perch extension for a bird feeder, the bird feeder having at least one perch, the perch extension comprising:
    an elongated perch body that defines a first end, a longitudinally opposite second end; a mounting cavity open at the second end that is configured to fit at least partially over the bird feeder perch; and a support member that defines a first end that is configured to be coupled to the perch body proximate the second end of the perch body, wherein the support member having a substantially semi-circular shape with a radius that is approximately the same as a radius of the bird feeder and the support member is configured to fit at least partially around the bird feeder.

4. The perch extension of claim 3, where the mounting cavity is configured to have a substantially similar shape as the bird feeder perch.

5. The perch extension of claim 3, where the perch body further comprises at least one protuberance that extends into the mounting cavity.

6. The perch extension of claim 3, where the perch body is configured to be removably coupled to the bird feeder perch.

* * * * *